(12) United States Patent
Scherzer et al.

(10) Patent No.: US 6,753,040 B1
(45) Date of Patent: Jun. 22, 2004

(54) ALKYDIPROPYLENETRIAMINES AND THEIR ADDUCTS AS HARDENERS FOR EPOXY RESINS

(75) Inventors: Wolfgang Scherzer, Bergkamen (DE); Jörg Volle, Selm/Bork (DE)

(73) Assignee: Vantico GmbH & Co. KG (DE)

( * ) Notice: Subject to any disclaimer, the term of this patent is extended or adjusted under 35 U.S.C. 154(b) by 0 days.

(21) Appl. No.: 10/088,940

(22) PCT Filed: Sep. 14, 2000

(86) PCT No.: PCT/EP00/08970

§ 371 (c)(1),
(2), (4) Date: Mar. 21, 2002

(87) PCT Pub. No.: WO01/21679

PCT Pub. Date: Mar. 29, 2001

(30) Foreign Application Priority Data

Sep. 23, 1999 (DE) .......................... 199 45 643

(51) Int. Cl.$^7$ ................................ B05D 3/02
(52) U.S. Cl. .................... 427/388.2; 525/523; 528/111; 528/123; 528/407; 528/420; 528/421
(58) Field of Search ...................... 427/388.2; 525/523; 528/111, 123, 407, 420, 421

(56) References Cited

U.S. PATENT DOCUMENTS 3,280,074 A   10/1966   Kirtland et al.
4,126,640 A   11/1978   Floyd
4,195,152 A    3/1980   Floyd
4,310,695 A    1/1982   Dante

FOREIGN PATENT DOCUMENTS

JP        10140125        5/1998

*Primary Examiner*—Robert Dawson
*Assistant Examiner*—David E. Aylward
(74) *Attorney, Agent, or Firm*—Proskauer Rose LLP; Tiffany A. Levato; Kristin H. Neuman

(57) ABSTRACT

A curable composition comprising a) an epoxy resin having on average more than one epoxide group per molecule and b1) an alkyldipropylenetrimine of general formula (I) and/or b2) an adduct of an alkyldipropylenetrimine of general formula (I) with b3) an epoxide compound having on average at least one epoxide group per molecule in which R is hydrocarbon radical 8 to 22 carbon atoms, and the use of this composition for mineral and metallic substrates.

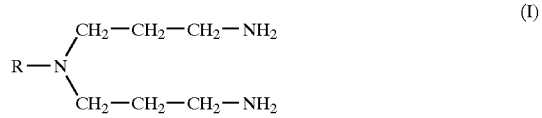

14 Claims, No Drawings

ALKYDIPROPYLENETRIAMINES AND THEIR ADDUCTS AS HARDENERS FOR EPOXY RESINS

The present invention relates to alkyldipropylenetriamines and their adducts with epoxide compounds having on average at least one epoxide group per molecule as hardeners for epoxy resins and to the use of curable compositions based on these alkyldipropylenetriamines and adducts and epoxy resins for coating mineral and metallic substrates.

Curable compositions based on amine curing agents and epoxy resins are widely used in industry to coat and enhance metallic and mineral substrates. Amine curing agents used in particular are aliphatic, cycloaliphatic or aromatic amines and also polyaminoamides with or without imidazoline groups.

The mechanical and physical properties of the curable compositions based on these amines are adequate for numerous applications.

Especially for the coatings sector, however, there is a requirement for binder systems which are surface tolerant, i.e., which exhibit good adhesion even on substrates that are difficult to coat, such as moist substrates or unpretreated metal panels, for example, and which ensure the very best protection of the substrate, e.g. corrosion protection. There is also a requirement for rapid initial curing of the binder systems following application to the substrates, even at low temperatures, in order, for example, to ensure that the substrates can soon withstand loading or be coated further.

High early water resistance of the still uncured film (for example, by forming droplets at high relative atmospheric humidities) is an important criterion, as is a low viscosity of the binder, so that it can still be processed even at low temperatures.

Known hardeners for epoxy resins which afford relatively good corrosion protection and exhibit serviceable adhesion even on difficult substrates include polyaminoamides, which normally contain imidazoline groups. These compounds are prepared by condensing generally unsaturated, long-chain fatty acids with polyethylenepolyamines. The disadvantage of these compounds is their high viscosity at low temperatures (<15° C.) and also the slow rate of initial cure and/or through-cure. Moreover, compounds of this type possess relatively high colour numbers.

It was therefore an object of the present invention to eliminate these disadvantages.

This object is achieved through the use of the curable compositions of the invention, comprising alkyldipropylenetriamines and/or their adducts with epoxide compounds which contain on average at least one epoxide group per molecule with epoxy resins.

It has surprisingly been found that the alkyldipropylenetriamines and/or their adducts of the invention, although similar in structure to the polyaminoamides with or without imidazoline groups, possess a much higher rate of initial cure and/or through-cure, especially at low temperatures of <15° C. Moreover, these compounds have, in comparison, a much lower viscosity and colour number.

The invention provides curable compositions comprising a) an epoxy resin having on average more than one epoxide group per molecule and b1) an alkyrdipropylonetriamine of the general formula (I) and/or b2) an adduct of an alkyidipropylenetriamine of the general formula (I) with b3) an epoxide compound having on average at least one epoxide group per molecule

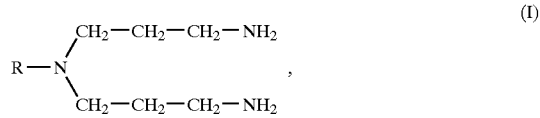

in which R is a hydrocarbon radical having 8 to 22, preferably 10 to 20. carbon atoms.

The compounds of the formula (I) are normally prepared by cyanoethylation of amines (fatty amines) and subsequent hydrogenation in accordance with conventional methods. The amines or, respectively, fatty amines are reacted with acrylonitrle, and then the cyanide groups are hydrogenated in the presence of a catalyst. Schematically, the reaction sequence is as follows:

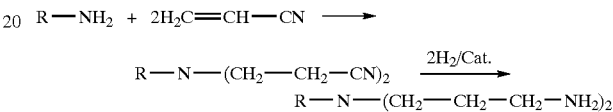

The fatty amines used preferably as reactants for the cyanoethylation are mixtures of long-chain primary alkylamines, obtained from mixed glycerol esters of medium and higher fatty acids with an even number of carbons, as occur in plant or animal bodies. For example, bovine tallow contains almost 100% (esterified) fatty acids having a carbon chain length of 14, 16 and 18 carbon atoms. The bovine tallow fatty amines obtained from bovine tallow are available commercially as tallow fatty amine, for example as Genamine® TA100 (Clariant). Therefore, if adducts of the invention are prepared starting from fatty amines of natural products, the products of the general formula (I) comprise mixtures of compounds with different chain lengths R. The chains R have approximately 8 to 20 carbon atoms, not more than approximately 22 carbon atoms, and may either be saturated or contain multiple bonds and may be either straight-chain or branched. Further examples of commercially available fatty amines which may be used in accordance with the invention, besides tallow fatty amine, are saturated straight-chain fatty amines such as dodecylamine, tetradecylamine, for example, saturated, branched fatty amines such as isotridecylamine, for example, unsaturated and saturated fatty amines and fatty amine mixtures, such as coconut fatty amine, oleylamine, rapeseed oil fatty amine, for example, or else stearylamine.

The present invention provides b2) adducts of compounds of the formula (I) with epoxide compounds containing on average at least one epoxide group per mole (b3). The adducts of the invention are prepared by known methods, by adding the epoxide compounds dropwise at 50° C.–100° C. with stirring to the initial charge of alkyldipropylenetrimine and then stirring the mixture at the same temperature for about 30 minutes until formation of adducts is as an end.

Also used are what are known as "isolated adducts", which are prepared with an excess of alkyldipropylenetrlamine. In this case, from 1.5 to 10, preferably 4–6, times the molar amount of amine are introduced as the initial charge and the epoxide compound is added dropwise with stirring, judiciously at 50–100° C., Subsequently, the excess amine is removed by distillation under reduced pressure.

The further provides a process for preparing the adduct, which comprises heating an alkyldipropylenetrimine of the formula (I) to reaction temperature (50–100° C.), subsequently adding at least one epoxide compound having on average at least one epoxide group in the molecule, with continued stirring, and finally, after the formation of adducts has ended, removing any excess alkyldipropylenetrimine from the reaction mixture.

In accordance with the invention, both the compounds of the formula (I) and the adducts with epoxide compounds that have derived from the compounds of the general formula (I) may be used as hardeners for epoxide compounds. Similarly, mixtures comprising at least one compound of the formula I and at least one adduct of compounds of the formula I with epoxide compounds may be used as hardeners for epoxide compounds. Similarly, mixtures of compounds of the formula (I) or, respectively, their adducts may be used in which the compounds of the formula (I) may have hydrocarbon radicals R which are different in terms of the respective chain length (8 to 20 carbon atoms), degree of branching and bond order. Moreover, the curable compositions of the Invention may comprise further amine curing agents, with or without the use of solvents, plasticizers, UV stabilizers, dyes, pigments and fillers.

The invention therefore additionally provides curable compositions comprising
a) an epoxy resin having on average more than one epoxide group per molecule and
b1) an alkyldipropylenetrimine of the general formula (I) and/or
b2) an adduct of an alkyldipropylenetrimine of the general formula (I) with b3) an epoxide compound having on average at least one epoxide group per molecule

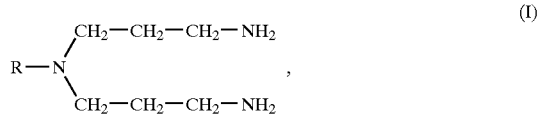

(I)

which R is a hydrocarbon radical having 8 to 22, preferably 10 to 20, carbon atoms, and, if desired, further optional components selected from
c) diluents, other amine components and other customary auxiliaries and additives.

The modifiers c) may be added equally to the hardener b) of the invention, to the resin a), with the exception of the amine component, or to the curable composition.

The curable compositions of the invention, comprising compounds of the general formula (I) and their adducts, are preferably adjusted with the modifiers to a preferred mixing ratio of 501–100 parts by weight of hardener per 100 g of epoxy resin (a). Depending on the establishment of desired end properties, the mixing ratios may also be below 50 and, respectively, above 100 parts by weight of hardener per 100 g of resin (a). The fraction of diluents should not exceed 40%, based on the hardener, since otherwise there is too great a drop in the mechanical data.

The ratio of reactive groups of the compounds of the general formula (I) and their adducts and any additional amines to the epoxide groups (a) and, if present, the epoxide compounds as per (b3) is preferably established at equivalence. Here too, however, depending on the establishment of desired properties, there may be deviations, in some cases very sharp, from equivalence, including both upward and downward deviations. The fraction of the hardeners of formula I and/or their adducts in the curing agent is between 10 and 7%, preferably between 20 and 50%.

As diluents it is possible to use both compounds which largely remain in the thermoset after curing, such as high-boiling alcohols and ethers such as benzyl alcohol, ethylene glycol, propylene glycol, butyl diglycol, etc., and compounds which predominantly evaporate from the coating in the course of curing, such as xylene, butanol, methoxypropanol, and also water, for example.

As additional amino components and for establishing the end properties it is possible to use all customary amines, such as polyethylene polyamines such as diethylenetriamine, triethylenetetramine, tetraethylenepentamine, etc.;

polypropylenepolyamines such as dipropylenetriamine, tripropylenetetramine, and also the polyamines obtained by cyanoethylation of polyamines, especially of ethylenediamine, and subsequent complete or partial hydrogenation;

aliphatic amines such as diaminoethane, diaminopropane, neopentanediamine, diaminobutane, hexamethylenediamine, 2,2,4(2,4,4)-trimethyl-1,6-shexamethylenediamine;

cycloallphatic polyamines such as isophoronediamine, diaminocyclohexane, norbomanediamine, 3(4),8(9)-bis(aminomethyl)tricyclo[5.2.1.0]decane (TCD-diamine), 1,3-bis(aminomethyl) cyclohexane, bis(aminomethylcydohexyl)methane; heterocyclc polyamines such as N-aminoethylpiperazine, 1,4-bis(aminopropyl)piperazine; aralphatic amines such as xylylenediamine; polyoxyalkylenepolyamines; aromatic amines, such as diaminodiphenylmethane, for example; polyaminoamides with or without imidazoline groups, such as condensation products of monomeric or dimeric fatty acids with polyethylenepolyarines, for example.

The epoxide compounds (b3) used for forming adducts with the aforementioned alkyldipropylenetriamines are the known and commercially customary products having at least one epoxide group per molecule. Preference is given in accordance with the invention to glycidyl ethers based on monohydric or polyhydric phenols, such as phenol, cresol, bisphenol A. bisphenol F, novolaks, monohydric or polyhydric aliphatic alcohols having 4 to 18 carbon-atoms, such as butanol, butanediol, hexanol, hexanediol, fatty alcohols having a chain length of 8 to 18 carbon atoms, polyoxyalkylene glycols such as diethylene glycol, dipropylene glycol, polyoxypropylene glycol, polyoxyethylene glycols, diethylene glycol monobutyl ether, and also epoxide compounds prepared by direct epoxidation, such as styrene oxide. As epoxide compound (b3) preference is given in particular to bisphenol A diglycidyl ether, bisphenol F diglyddyl ether, cresyl glycidyl ether and fatty alcohol glycidyl ethers.

The degree of adduct formation may be varied within wide limits and is influenced by the nature of the amine compound and by the nature of the epoxide compound, and may also be tailored to the respective field in which the curable composition is employed.

Positive results are generally always obtained using from 0.1 to 1 mol of the epoxide compound per mole of the amine compound, so that on average there are more than 2 free amine hydrogens in the adduct.

The epoxide compounds (a) used in accordance with the Invention are commercially customary products having on average more than one epoxide group per molecule, and are derived from monohydric and/or polyhydric and/or polycyclic phenols, especially bisphenols, and also novolaks, for example, bisphenol A diglycidyl ether and bisphenol F diglycidyl ether. An extensive listing of these epoxide compounds may be found in the handbook "Epoxidveibindungen und Epoxidharze"[Epoxide Compounds and Epoxy Resins] by A. M. Paquin, Springer Veriag, Berlin, 1958, Chapter IV, and in Lee & Neville, "Handbook of Epoxy Resins", 1967, Chapter 2. It is also possible to use mixtures of two or more epoxide compounds (a). Preference is given in accordance with the invention to mixtures of glycidyl ethers based on bisphenol A, bisphenol F or novolaks with what are known as reactive diluents, such as monoglycidyl ethers of phenols or glycidyl ethers based on monohydric or polyhydric aliphatic or cycloaliphatic alcohols, for example. Examples of such reactive diluents are phenyl glycidyl ether, cresyl glycidyl ether, p-tert-butylphenyl glycidyl ether, butyl glycidyl ether, C12–C14 alcohol glycidyl ethers, butane diglycidyl ethers, hexane diglycidyl ethers, cyclohexanedimethyl diglycidyl ethers or glycidyl ethers based on polyethylene glycols or polypropylene glycols. If necessary, the viscosity of the epoxy resins may be reduced further by adding these reactive diluents. As the epoxide compound (a), particular preference is given to bisphenol A diglycidyl ether and bisphenol F diglycidyl ether.

The customary auxiliaries and additives may also be admixed to the curable compositions of the invention, examples being fillers such as gravels, sands, silicates, graphite, silica, talc, mica, etc., In the particle size distributions customary in this field, and also pigments, dyes, stabilizers, levelling/plasticizing agents, non-reactive extender resins and plasticizers.

On the basis of their advantageous properties, the curable compositions of the invention are suitable for processes for coating mineral (e.g. concrete, screeding) and metallic substrates, especially where the substrates to be coated are difficult. Difficult-to-coat substrates are, for example, moist substrates, in the form, for example, of fresh concrete floors, and also substrates with little, no or poor pretreatment. In these cases the curable compositions of the invention are found, surprisingly, to be highly surface tolerant, In the sense that they generally lead to good adhesion of the coating even to non-pretreated substrates. On the basis of the rapid initial cure and through-cure, and high early water resistance, that is achievable, and on the basis of their comparatively low viscosity, therefore, the compositions of the Invention also enable coatings to be applied and through-cured under difficult external conditions, by which are meant relatively low temperatures of below 30° C. down into the freezing point range, and relatively high atmospheric humidities of 50% to 100%.

Coating may take place by conventional techniques, by applying the curable composition from the liquid, slurry or pastelike state by brushing, spreading, painting, dispersion-coating or melt-coating, by extrusion, flow coating or dipping, or as a so-called hot-melt. The components of the curable composition are not combined and substantially homogenized until a short time before their use. After coating has taken place, the compositions of the invention may be cured by heating at moderately elevated (30–100° C.) temperatures. The curing time is, of course, dependent on the respective application conditions, such as coating thickness, substrate properties, external conditions, etc. A key advantage in accordance with the invention, however, is that rapid initial cure and substantial through-cure of the coatings is possible without external supply of heat on the sole basis of the prevailing external ambient temperatures, which may be between 0 to 5° C. and 30° C., and in particular below 15° C.

The invention therefore further provides, in addition, the cured compositions of the invention.

ANALYTICAL METHODS

Viscosity

Measured with a Haake RV 20 rotational viscometer In accordance with the manufacturer's instructions.

Colour Number

Measured in accordance with DIN 53 995 using the Lovibond colorimeter (Gardner colour number, APHA colour number).

Amine Number

Measured in accordance with DIN 16 945.

Tecam Value

Value for the gel time measured with the Tecam gelation timer GT3 from Techne, Cambridge, GB, at 23° C. and 50% relative atmospheric humidity. Sample mixture of resin and hardener and accelerator=250 g.

Shore D Hardness

Measured with the instrument type 38009 from Karl Frank GmbH on test specimens of 30 mm in diameter and 6 mm in thickness after 1 day and 7 days and after 2 days and 24 hours of storage at 70° C.

Earty Water ResiTwince/Blushing of the Film on Water Exposure

Sample Preparation:

The calculated amounts of epoxy resin and amine hardener are weighed out into the mixing vessel and mixed thoroughly for approximately 2 minutes using a spatula without incorporating air to an excessive extent. Local ihomogeneities show up as smearing and are to be avoided.

A 500 $\mu$m film-drawing frame from Erichsen is placed on a glass plate which has been cleaned with acetone and then dried, and the frame is filled with approximately 15 9 g of the reactive mixture and drawn uniformly over the free area. The freshly coated glass plates are immediately placed in the corresponding controlled climate chambers, typically at a relative atmospheric humidity (RH) at 23° C. of approximately 95%, at 10° C. of approximately 80%.

To determine the early water resistance, the glass plates are brought back into the testing laboratory after 24 h of curing.

For the test, evaluation figures (along the lines of DIN 53230) are awarded:

0=no defect up to 5=very severe defects.

In the case of precision differentiation, using comparison samples, for example, gradations of 0.5 are possible.

Approximately 0.5 ml of fully deionized water is applied by pipette to an area of each plate, and is dabbed off with cellulose after 60 minutes.

An assessment is made of the extent of coloration/blushing of the film at the water-exposed area.

EXAMPLE

Example 1

(Hardener)

N,NBis-amino-propyl-tallow fatty amine, prepared by reacting tallow fatty amine (a mixture of saturated and unsaturated alkylamines having 14–20 carbon atoms) with acrylonitrile and then hydrogenating the cyanide groups.

Example 2

(Hardener+Diluent)

90 g of N,N-bis-amino-propyttahlow fatty amine as per Example 1 and 10 g of benzyl alcohol are homogenized at room temperature.

Example 3

(Adduct+Diluent)

80 g of N,N-bis-amino-propyl-tallow fatty amine as per Example 1 and 10 g of benzyl alcohol are introduced Into a reaction vessel, then 10 g of a bisphenol A diglycidyl ether having an epoxide equivalent weight of 185 are added continuously over the course of approximately 20 minutes at 60–90° C.

Stirring is continued for about 10 minutes and then the mixture is cooled to room temperature.

Example 4
(Adduct+Diluent)

The following are reacted in accordance with Example 3:
90 g of N,N-bis-amino-propyl-tallow fatty amine as per Example 1 and
10 g of cresyl glycidyl ether (epoxide equivalent approximately 180), and also
10 g of benzyl alcohol.

Example 5
(Adduct+Diluent

The following are reacted in accordance with Example 3:
90 g of N,N-bis-amino-propyl-tallow fatty amine as per Example 1 and 10 g of a long-chain aliphatic glycidyl ether having an epoxide equivalent weight of 315, and 10 g of benzyl alcohol.

Example 6
(Hardener+Amine Co-hardener+Diluent)

40 g of NN-is-aino-propyl-tallow fatty amine as per Example 1,
27 g of isophoronediamine and
33 g of benzyl alcohol are homogenized at room temperature.

Example 7
(Adduct+Diluent)

The following are reacted in accordance with Example 3:
50 g of lauryidipropylenetriamine (prepared as per Example 1 on the basis of laurylamine (alkylamine mixture having 8–18 carbon atoms per molecule)) and
20 g of a commercially customary glycidyl ether based on bisphenol A, having an epoxide equivalent weight of 185 g/eq, and
30 g of benzyl alcohol are homogenized at room temperature.

Example 8
(Comparative Hardener)

Standard commercial polyaminoimidazoline, prepared by condensing triethylenetetramine and tall oil fatty acid by conventional techniques.

Example 9
(Comparative Adduct+Diluent)

80 g of the polyaminolmidazoline as per Example 8 and 10 g of benzyl alcohol are introduced into a reaction vessel, then 10 g of a bisphenol A diglycidyl ether having an equivalent weight of 185 are added continuously over the course of approximately 20 minutes at 60–90° C.

The mixture obtained is subsequently stirred for 10 minutes and then cooled to room temperature.

Example 10
(Comparative Hardener)

Standard commercial polyaminoimidazoline, prepared by condensing triethylenetetramine and dimerlzed talloil fatty acid by a conventional technique.

The properties and measurements obtained for Examples 1–10 are listed in Table 1.

TABLE 1

| Example/Measurements | 1 | 2 | 3 | 4 | 5 | 6 | 7 | 8 | 9 | 10 |
|---|---|---|---|---|---|---|---|---|---|---|
| Viscosity in mPa · s/25° C. | 26 | 33 | 141 | 40 | 35 | 24 | 195 | 250 | 1720 | 16000 |
| Amine number mg KOH/g | 430 | 385 | 345 | 385 | 385 | 350 | 275 | 390 | 312 | 390 |
| Colour number (Gardner) | <1 | 1 | 1–2 | 1–2 | 1 | <1 | <1 | 8 | 7 | 8 |
| g hardener per 100 g resin*1 | 50 | 55 | 60 | 60 | 60 | 50 | 100 | 50 | 60 | 50 |
| Tecam value (min) | 175 | 103 | 102 | 135 | 168 | 76 | 85 | 180 | 205 | 120 |
| Shore D hardness development at 10° C.: | | | | | | | | | | |
| 1 Day | 21 | 28 | 11 | 10 | 5 | 43 | 54 | 0 | 0 | 11 |
| 2 Days | 52 | 63 | 49 | 45 | 37 | 68 | 72 | 37 | 20 | 49 |
| Final hardness*2 | 77 | 76 | 78 | 76 | 74 | 80 | 80 | 78 | 77 | 75 |
| Early water resistance after 24-hour storage at: | | | | | | | | | | |
| 10° C./80% RH | 0.5 | 0 | 0 | 0 | 1 | 2 | 1–2 | 3 | 4 | 3 |
| 23° C./50% RH | 0 | 0 | 0 | 0 | 0 | 0 | 0 | 1 | 3 | 2 |

Notes:
RH = relative atmospheric humidity
*1Araldite GY 250 = commercial epoxy resin based on bisphenol A, epoxide equivalent weight: 185
*2Curing for 2 days at room temperature and 24 hours at 70° C.

What is claimed is:
1. A curable composition comprising
   a) an epoxy resin having on average more than one epoxide group per molecule and
   b) an adduct of an alkyldipropylenetrimine of the general formula (I) with an epoxide compound having on average at least one epoxide group per molecule,

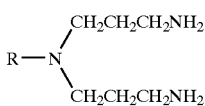

in which R is a hydrocarbon radical having 8 to 22 carbon atoms.

2. A curable composition according to claim 1, optionally comprising one or more modifiers selected from the group consisting of diluents, other amine components and other customary auxiliaries and additives.

3. A curable composition according to claim 1, wherein the adduct b) is a mixture of said adducts characterized by hydrocarbon radicals "R" that are different in terms of chain length, degree of branching or bond order.

4. A curable composition according to claim 1, wherein component a) is a bisphenol A diglycidyl ether or bisphenol F diglycidyl ether.

5. A curable composition according to claim 1, wherein the epoxide compound of component b) is a bisphenol A diglycidyl ether, bisphenol F diglycidyl ether, cresyl glycidyl ether or fatty alcohol glycidyl ether.

6. A cured composition comprising a composition according to claim 1.

7. A curable composition according to claim 1, wherein R is a hydrocarbon radical having 10 to 20 carbon atoms.

8. A curable composition according to claim 1, wherein the adduct b) is formed from 0.1 to 1 mole of the epoxide compound of b) per mole of the amine compound of b), so that on average there are more than two free amine hydrogens in the adduct.

9. The curable composition according to claim 2, wherein element b) is adjusted with any modifiers to a preferred mixing ratio of 50-100 parts by weight of hardener per 100 grams of epoxy resin a).

10. The curable composition of claim 2, wherein the ratio of reactive groups in the adduct b), plus any additional amine modifiers, and the reactive groups in the epoxide compounds in the composition is established at equivalence.

11. The curable composition of claim 2, wherein the fraction of the adduct b) in the total curing agent (adduct plus any additional amine modifiers) is between 10 and 70%.

12. The curable composition of claim 2, wherein the fraction of the adduct b) in the total curing agent (adduct plus any additional amine modifiers) is between 20 and 50%.

13. A process for coating a mineral and/or metallic substrate comprising the step of applying a curable composition according to claim 1 to the substrate.

14. The process of claim 13, comprising the additional subsequent step of curing said composition by heating at moderately elevated temperatures.

* * * * *